United States Patent [19]
Guenthner et al.

[11] Patent Number: 5,263,034
[45] Date of Patent: Nov. 16, 1993

[54] ERROR DETECTION IN THE BASIC PROCESSING UNIT OF A VLSI CENTRAL PROCESSOR

[75] Inventors: Russell W. Guenthner; Clinton B. Eckard, both of Glendale; Leonard Rabins, Scottsdale; William A. Shelly, Phoenix; Ronald E. Lange, Glendale; David S. Edwards, Phoenix; Bruce E. Flocken, Glendale, all of Ariz.

[73] Assignee: Bull Information Systems Inc., Phoenix, Ariz.

[21] Appl. No.: 594,880

[22] Filed: Oct. 9, 1990

[51] Int. Cl.⁵ .......................................... G06F 11/16
[52] U.S. Cl. ................................. 371/68.3; 395/575
[58] Field of Search .................. 371/68.1, 68.2, 68.3, 371/9.1; 364/268.4, 268.1, 943.92; 395/575

[56] References Cited

U.S. PATENT DOCUMENTS

| | | | |
|---|---|---|---|
| 4,358,823 | 11/1982 | McDonald et al. | 371/68.3 X |
| 4,514,803 | 4/1985 | Agnew et al. | 395/500 |
| 4,654,857 | 3/1987 | Samson et al. | 371/68.3 X |
| 4,792,955 | 12/1988 | Johnson et al. | 371/68.1 X |
| 4,843,608 | 6/1989 | Fu et al. | 371/68.1 |
| 4,849,979 | 7/1989 | Maccianti et al. | 371/68.3 |
| 4,856,000 | 8/1989 | Bauge et al. | 371/9.1 |
| 5,054,026 | 10/1991 | Tsubota | 371/68.3 |

OTHER PUBLICATIONS

Männer, R., "Hardware Task/Processor Scheduling in a Polyprocessor Environment", *IEEE Trans on Computers*, vol. C-33, No. 7, Jul. 1984, pp. 626-636.
Johnson, D., "The Intel 432-A VLSI Architecture for Fault-Tolerant Computer Systems", *IEEE Computer*, Aug. 1984, pp. 40-48.
Olson, T., "Fault-Tolerant Chips Increase System Reliability", *Computer Design*, Mar. 15, 1986, pp. 75-80.
Ciminiera, L. et al., *Advanced Microprocessor Architectures*, Addison-Wesley Pub. Co., Inc., 1987, pp. 388-391, 423-439.

*Primary Examiner*—Stephen M. Baker
*Attorney, Agent, or Firm*—J. H. Phillips

[57] ABSTRACT

In order to provide efficient error detection in a central processor's Basic Processing Unit (BPU) including an AX (address and execution) module, a DN (decimal numeric) module and an FP (floating point) module, each module is provided redundantly in a master/slave pair, and the local result of data manipulation operations performed in each pair are compared for identity before the results are validated for subsequent use in the central processor.

5 Claims, 6 Drawing Sheets

ERROR DETECTION IN THE BASIC PROCESSING UNIT OF A VLSI CENTRAL PROCESSOR

FIELD OF THE INVENTION

This invention relates to information processing systems and, more particularly, to error detection in the Basic Processing Unit (BPU) of a Very Large Scale Integrated (VLSI) circuit Central Processing Unit (CPU).

BACKGROUND OF THE INVENTION

In the design of a mainframe CPU employing VLSI technology, it is desirable to limit the number of different types of VLSI chips employed in order to contain the design task within manageable bounds. However, it is also highly desirable to provide powerful and reliable error detection and handling features, and this requirement has mandated the provision of various circuits, firmware and software to sense and resolve the diverse types of errors which may occur in operation.

Among the possible error conditions encountered in a VLSI central processing unit are those in which one of the modules of a BPU, performing routine data manipulation such as calculating, simply reaches an incorrect result. It can be shown that employing built-in error detection (e.g., parity checking) in the circuitry of a BPU results in a significant increase in circuitry. This effect not only substantially extends the design effort required to develop a BPU, but also increases the "real estate" or space occupied by the BPU and its support circuitry and consequently that of the CPU. It also may significantly degrade the performance of the most "time-critical" circuitry in the BPU.

OBJECTS OF THE INVENTION

It is therefore a broad object of this invention to provide improved error detection capability in a VLSI CPU.

It is a more specific object of this invention to provide such improved error detection which operates at high speed to identify errors in data manipulation operations performed in the BPU of a CPU.

In another aspect, it is a another object of this invention to provide such improved error detection which is very reliable while being incorporated into the minimum number of differently configured modules making up a BPU.

SUMMARY OF THE INVENTION

Briefly, these and other objects of the invention are achieved in an exemplary Basic Processing Unit (BPU) including an AX (address and execution) processor module, a DN (decimal numeric) processor module and an FP (floating point) processor module by including in each such unit two substantially identical modules forming a master/slave pair and comparing the local result of data manipulation operations performed in each pair of modules of a given processor unit for identity before the results are validated for subsequent use in the central processing unit.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
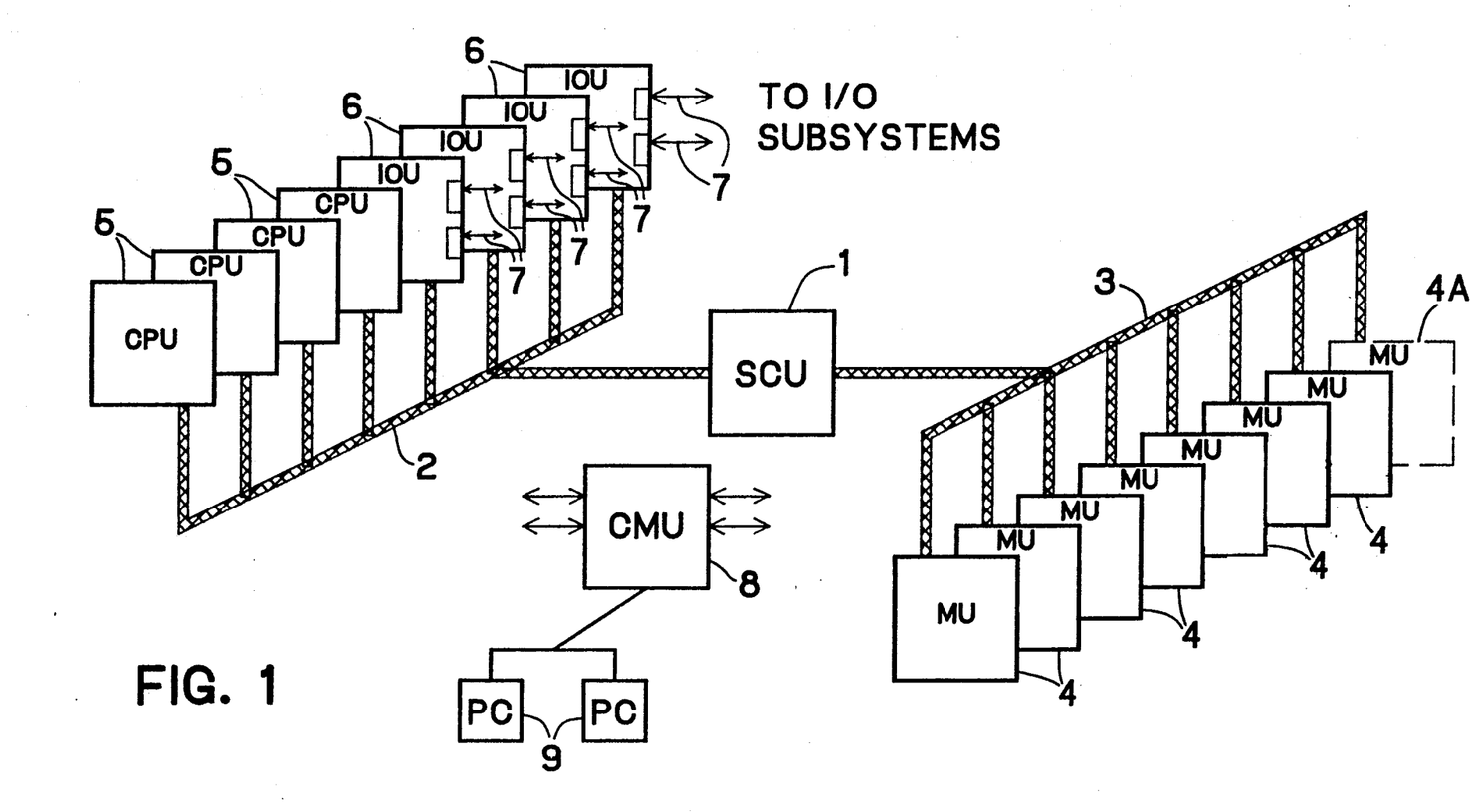
FIG. 1 is a very high level block diagram of the central system structure of an information processing system in which the subject invention finds application.

Attention is first directed to FIG. 1 which illustrates an exemplary Central Subsystem Structure (CSS) within which the subject invention may be incorporated. The System Control Unit (SCU) 1 centralizes and controls the system bus 2 and the memory bus 3 scheduling. More particularly, the SCU 1: A) performs memory control, single bit error correction and double bit error detection; B) controls the memory configuration of which there are one per Memory Unit (MU) 4; C) manages 64-byte block transfer Central Processing Units (CPUs) 5 and the MUs in conjunction with the store-into-cache feature of the CPUs; D) corrects single bit errors found in modified blocks of a CPU's cache or on a data transfer from a CPU, MU or Input/Output Unit (IOU) 6; and E) contains the system calender clock.

The system bus 2 interconnects 1 to 4 CPUs and 1 to 4 IOUs with each other and with the SCU. The system bus includes a 16-byte bidirectional data interface, a bidirectional address and command interface, an SCU status interface monitored by all CPUs and IOUs, and a small number of control lines between the SCU and each individual CPU and IOU. Data is exchanged on the system bus in 16, 32 or 64-byte groups, and data exchanges can be between a CPU and an MU, an IOU and an MU, two CPUs and a CPU and an IOU. The operations through the system bus 2 are:
Read: 16, 32 or 64 bytes;
Read with exclusivity: 64 bytes;
Write from IOU: 16, 32 or 64 bytes;
Write from CPU (swapping): 64 bytes;
Interrupts and Connects;—Read/Write registers.

Every system bus operation consists of an address phase and a data phase, and an address phase can start every two machine cycles. Consecutive 16-byte data transfers within a group can occur on consecutive machine cycles. An IOU or CPU can wait for the data phase of up to two requests at the same time. The data blocks are transferred in the same order as the requests are received.

The memory bus 3 interconnects 1 to 8 MUs with the SCU. The memory bus includes a 16-byte bidirectional data interface, an address and command interface from the SCU to all MUs and a small number of control lines between the SCU and each individual MU. Data is exchanged on the memory bus in 16, 32 or 64-byte groups. The operations through the memory bus 3 are:
Read: 16, 32 or 64 bytes;
Write 16, 32 or 64 bytes.

The main memory is composed of up to eight MUs. (A ninth slot, MU 4A, may be provided for ease of reconfiguration and repair in case of failure.) A single bit correction, double bit detection code is stored with every double word; i.e., 8 code bits for every 72 data bits. The code is arranged so that a 4-bit error within a single chip is corrected as four single bit errors in four different words. Data in an MU is addressed from the SCU in 16 byte (four word) increments. All bytes within any one MU are consecutively addressed; i.e., there is no interlace between MUs which operate in parallel. A memory cycle may start every machine cycle, and a memory cycle, as seen from a CPU, is ten machine cycles, assuming no conflicts with other An MU 4 contains 160 Dynamic Random Access Memory (DRAM) circuits, each of which has n by 4 bit storage elements where $n \leq 256$, 1024 or 4096.

The IOUs 6 each provide a connection between the system bus 2 and two Input/Output Buses (IOBs) 7 such that each IOB interfaces with a single IOU. Thus, an IOU manages data transfers between the CSS and the I/0 subsystems, not shown in FIG. 1.

A Clock and Maintenance Unit (CMU) 8 generates, distributes and tunes the clock signals for all the units in the CSS, provides the interface between the service processor(s) (SP) 9 and the central processing, input-/output and power subsystems, initializes the units of the CSS and processes errors detected within the CSS units. The CSS employs a two-phase clock system and latched register elements in which the trailing edge of clock 1 defines the end of phase 1, and the trailing edge of clock 2 defines the end of phase two, each phase thus being one-half of a machine cycle.

The SP(s) 9 may be a commodity personal computer with an integrated modem for facilitating remote maintenance and operations, and large systems may include two SPs through which the system can be dynamically reconfigured for high availability. The SP performs four major functions:
monitors and controls the CSS during initialization, error logging or diagnostic operations;
serves as the primary operating system console during system boot or on operator command;
serves as console and data server for the input/output subsystems Maintenance Channel Adaptor (MCA);
provides a remote maintenance interface.

Figure 2:
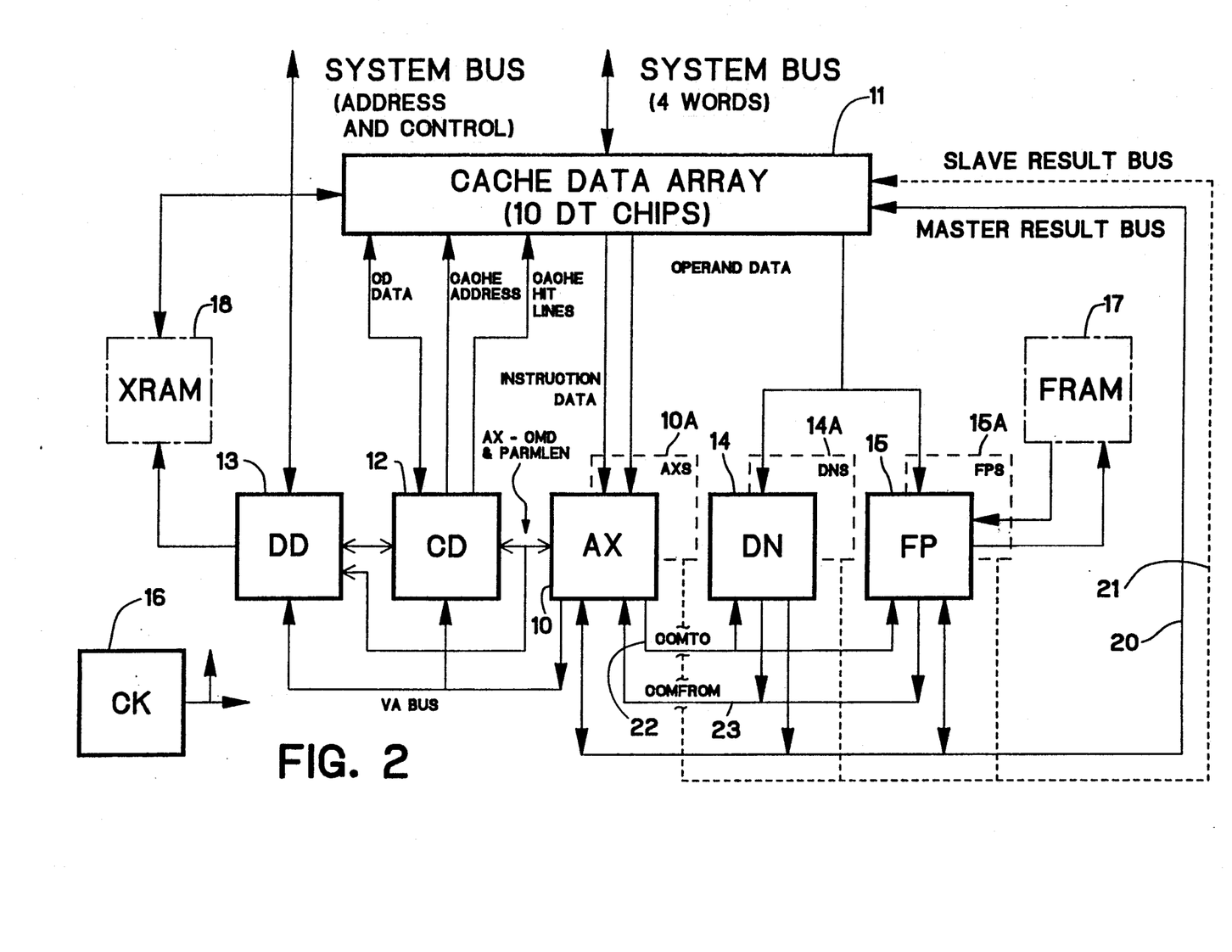
FIG. 2 is a general block diagram of the central processing unit of the central system structure of FIG. 1, in which central processing unit the subject invention is employed.

Attention is now directed to FIG. 2 which is a general block diagram of one of the CPUs 5 of FIG. 1. The Address and Execution (AX) unit is a microprocessing engine which performs all address preparation and executes all instructions except decimal arithmetic, binary floating point and multiply/divide instructions. Two identical AX chips, or modules, 10, 10A perform duplicate actions in parallel, and the resulting outputs of the AX modules are constantly compared to detect errors. The structure of the AX module will be described in more detail below. The main functions performed by the AX unit include:
effective and virtual address formation;
memory access control;
security checks;
register change/use control;
execution or basic instructions, shift instructions, security instructions, character manipulation and miscellaneous instructions.

The cache unit includes a data part of 64K bytes (16K words) and a set associative directory part which defines the main memory location of each 64-byte (16-word) block stored in the cache data part. Physically, the cache unit is implemented in an array of ten DT chips 11, a cache directory (CD) chip 12 and a duplicate directory (DD) chip 13. Each of the DT, CD and DD chips will be described in more detail below.

The specific functions performed by the DT chip array 11 include:
combined instruction and operand data storage;
instruction and operand buffering and alignment;
data interface with the system bus 7 (FIG. 1);
CLIMB safestore file.

The cache write strategy is "store into". If a longitudinal parity error is detected when reading a portion of a modified block from the cache, the block will be swapped out of the cache, corrected by the SCU and written into main memory. The corrected block will then be refetched from main memory.

Two copies of the cache directory information are respectively maintained in the CD and DD chips which perform different logic functions. The two directory copies allow interrogation of the cache contents from the system bus in parallel and without interference with instruction/operand access from the CPUs and also provide for error recovery. Functions performed by the CD chip 12 include:
cache directory for CPU accesses;
instruction, operand and store buffer management;
virtual-to-real address translation paging buffer.
Functions performed by the DD chip 13 include:
cache directory for system accesses;
system bus control;
distributed connect/interrupt management;
cache directory error recovery.

Efficient scientific calculation capability is implemented on the Floating Point (FP) chips, or modules, 15, 15A. The identical FP chips execute all binary floating point arithmetic in duplicate. These modules, operating in concert with the duplicate AX modules 10, 10A, perform scalar or vector scientific processing.

The FP module 15 (duplicated by the FP chip submodule 15A):
executes all binary and fixed and floating point multiply and divide operations;
computes 12 by 72-bit partial products in one machine cycle;
computes eight quotient bits per divide cycle;
performs modulo 15 residue integrity checks.

Functions performed by the FP chips 15, 15A include:
executes all floating point mantissa arithmetic except multiply and divide;
executes all exponent operations in either binary or hexadecimal format;
preprocesses operands and postprocesses results for multiply and divide instructions;
provides indicator and status control.

Two special purpose random access memories (FRAM 17 and XRAM 18) are incorporated into the CPU. The FRAM chip 17 is an adjunct to the FP modules 15, 15A and functions as an FP control store and decimal integer table lookup. The XRAM chip 18 is an adjunct to the AX modules 10 10A and serves as a scratchpad as well as providing safestore and patch functions.

The CPU also employs a Clock Distribution (CK) chip 16 whose functions include:
clock distribution to the several chips constituting the CPU;
shift path control;
maintenance;
interface between CMU and CPU;
provision of clock stop logic for error detection and recovery.

The DN chip, or module, 14 (in parallel with the DN chip, or module, 14A) performs the execution of the decimal numeric Extended Instruction Set (EIS) instructions. It also executes the Decimal-to-Binary (DTB), Binary-to-Decimal (BTD) conversion EIS instructions and Move-Numeric-Edit (MVNE) EIS instructions in conjunction with the AX chip 10. The DN chip both receives operands from memory and sends results to memory via the cache unit 11.

The AX, DN and FP modules, collectively, are sometimes referred to as the Basic Processing Unit (BPU). It was previously noted that the AX, DN and FP modules were duplicated with the duplicate modules operating in parallel to obtain duplicate results which are available for integrity checking. (The module pairs are respectively named the AX unit, the DN unit and the FP unit for convenience.) Thus, master and slave results are obtained in the normal operation of these modules. The master results are placed onto a Master Result Bus (MRB) 20 while the slave results are placed onto a Slave Result Bus (SRB) 21. Both the master and slave results are conveyed, on the MRB and SRB respectively, to the cache data array 11 of DT chips. The purposes of this arrangement will be described more fully below. In addition, a COMTO bus 22 and a COMFROM bus 23 couple together the AX unit, the DN unit and the FP unit for certain interrelated operations as will also be described more fully below.

Those skilled in the art will understand that a VLSI CPU is subject to the occurrence of numerous errors. While state of the art VLSI CPU's are very reliable and may run for long periods with no errors whatever occurring, there is little tolerance in many applications for accommodating even occasional errors. As a result, it is necessary to provide many error sensing and recovery circuits throughout the logic of a CPU to detect several types of errors such as parity errors (as a common example) which may occur when information is transferred between elements of the CPU. As previously noted, in the specific CPU chosen for illustration and in which the invention finds particular application, the outputs of duplicate master and slave AX, FP and DN modules are compared for identical results, and the content of the Master and Slave Result Busses are compared in the Cache Unit for similar identity. Various other errors are sensed throughout the CPU. According to the subject invention, the CK chip receives the error signals and has a primary role in coordinating the error handling processes in the exemplary CPU.

Figure 3:
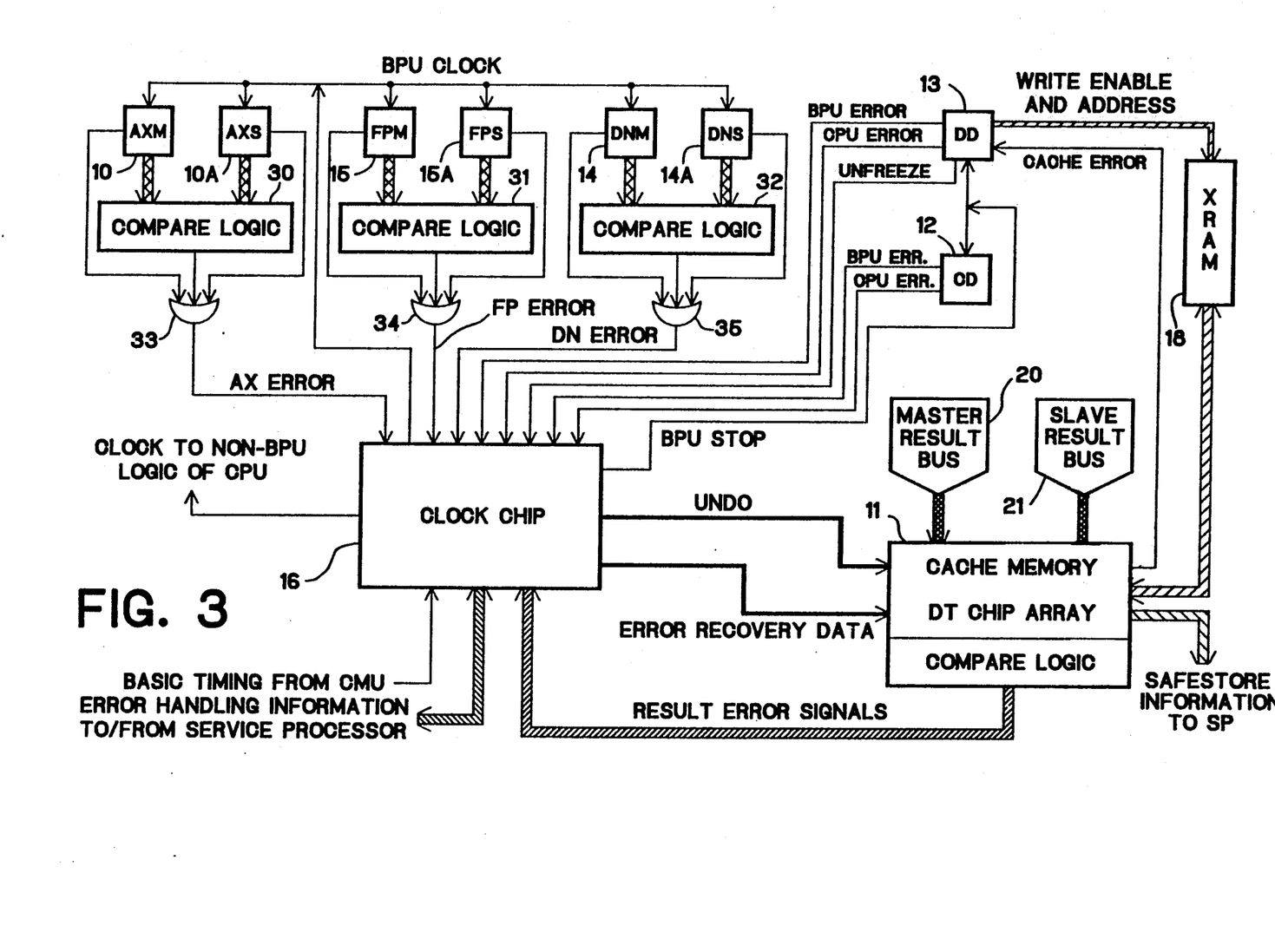
FIG. 3 is a special purpose block diagram of the central processing unit revealing the error detection and handling aspects of the relationships among the several logic elements.

Attention is now directed to FIG. 3 in which the CPU is shown in a redrawn configuration more specifically oriented to disclose the present invention which is directed to certain aspects of the system facility for sensing and handling CPU errors. It will be seen that numerous errors are reported to the CK chip 16. The CPU has a variety of sources of internally detected errors which are classified as hardware retryable, software retryable or non-retryable. Hardware retryable errors are those which are directly compensated by the hardware without involvement or intervention by the software operating system and with little or no involvement by the SP 9 (FIG. 1) to which all errors are reported. Certain paging and cache directory errors, for example, are deemed hardware retryable. For other error conditions, which may be software retryable or non-retryable, the CK chip 16 will either cause a freeze of BPU or CPU clocks as quickly as possible to minimize any loss of data relating to the failing condition or it will invoke a suspension of BPU and system bus operation. Two types of software retry are employed, one corresponding to a freeze and the other to a suspend. If a clock freeze occurs, the machine state is extracted by the SP and provided to the operating system for retry. If a BPU or CPU suspension occurs, the SP may direct a CPU resume, and the operating system will attempt a software retry.

All errors are reported to the SP9 which scans safestore information and other information to make a preliminary determination regarding the ability of the error-detecting CPU (or another CPU) to attempt a retry. Retry conditions are further evaluated by the operating system, and the actual software retry is done by execution on one of the CPUs.

Each of the AX chips 10, 10A, FP chips 15, 15A and DN chips 14, 14A combine multiple error signal lines (as represented by OR-gates 33, 34, 35), including those from the individual unit compare logic blocks 30, 31, 32, to obtain AX, FP and DN ERROR signals which are applied to the CK chip 16. The majority of the checked logic areas sense parity errors during data transfers, but other error types, such as directory read mismatch, DIR Level In/Out miscompares, illegal command sequence, increment miscount, multiple directory hit, etc. as well as several types of compares are all monitored. The CD chip 12 and DD chip 13 each send separate BPU error and CPU error signals to the CK chip.

AX errors, FP errors, DN errors and result bus errors are all deemed to be BPU errors. However, the CD chip 12 and the DD chip 13 can detect and advise the CK chip 16 of either BPU errors or CPU errors (for example, cache errors) which are treated differently. In addition, the CD and DD chips are notified of BPU errors originating elsewhere, and, under certain conditions (such as during a hardware/firmware troubleshooting process), the DD chip 13 may order a temporary "unfreeze" of the BPU clock. Certain cache errors are reported directly to the DD chip 13 which then determines if a BPU or CPU error signal is to be forwarded to the CK chip 16.

Figure 4:
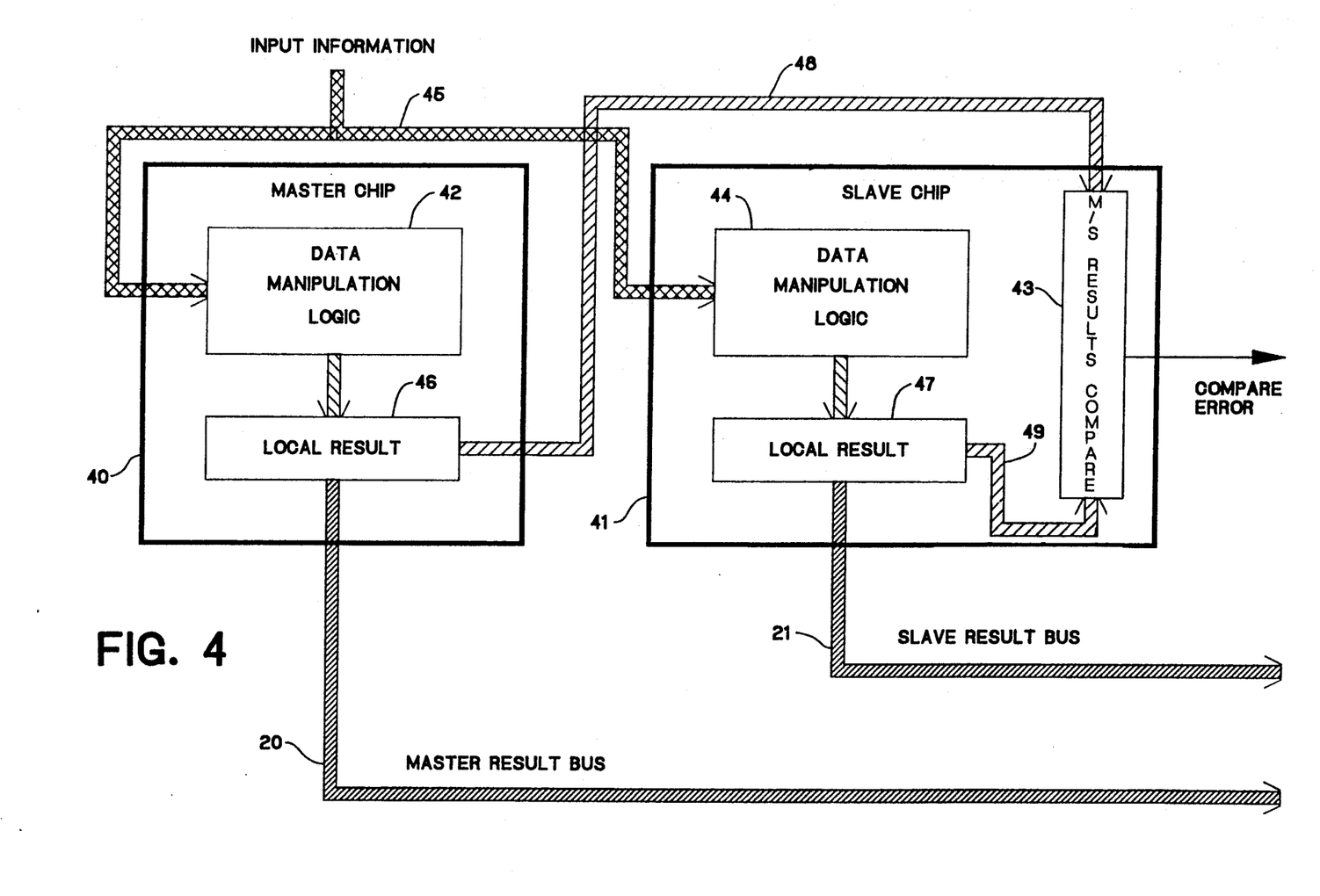
FIG. 4 is a high level block diagram illustrating the error detection relationship between master and slave duplicate modules of the basic processing unit.

Attention is now directed to FIG. 4 which is a high level block diagram of a master/slave chip, or module, pair; i.e., for the purpose of explaining the invention, the master chip 40 and the slave chip 41 may each be AX, DN or FP chips. The necessary logic circuitry is provided in each case to develop a CHIP COMPARE ERROR signal if the results of data manipulation carried out in each of the paired chips or modules, does not reach an identical result. Therefore, it will be understood that the data manipulation logic 42 of the master chip, or module, 40 the identical data manipulation logic slave chip, or module, 41 each receive the identical input information (instructions, control signals, operands, etc.) as represented by the bus 45. The local result of discrete data manipulation operations performed in the master and slave chips, or modules are held in respective local result temporary storage blocks 46, 47 such that the contents of these storage blocks can be checked at the completion of each data manipulation operation for content identity.

Referring briefly again to FIG. 3, the compare logic blocks 30, 31, 32 are shown separately from their respective master/slave pairs. However, it is preferable to incorporate this function into both the slave chip, or module, and the master chip, or module, of each pair and then to enable its function only in the slave chip. Thus, referring again to FIG. 4, it will be seen that the contents of each of the local result temporary storage blocks 46, 47 are applied, via busses 48, 49, to a master/slave results compare block 43 resident in the slave chip, or module, 41. As will be discussed in more detail below, if the data manipulation results obtained in the master and slave chips are not identical, the master/slave results compare block 43 issues the CHIP COMPARE ERROR signal which is supplied to the CK chip 16 (FIG. 23).

Figures 5, 7:
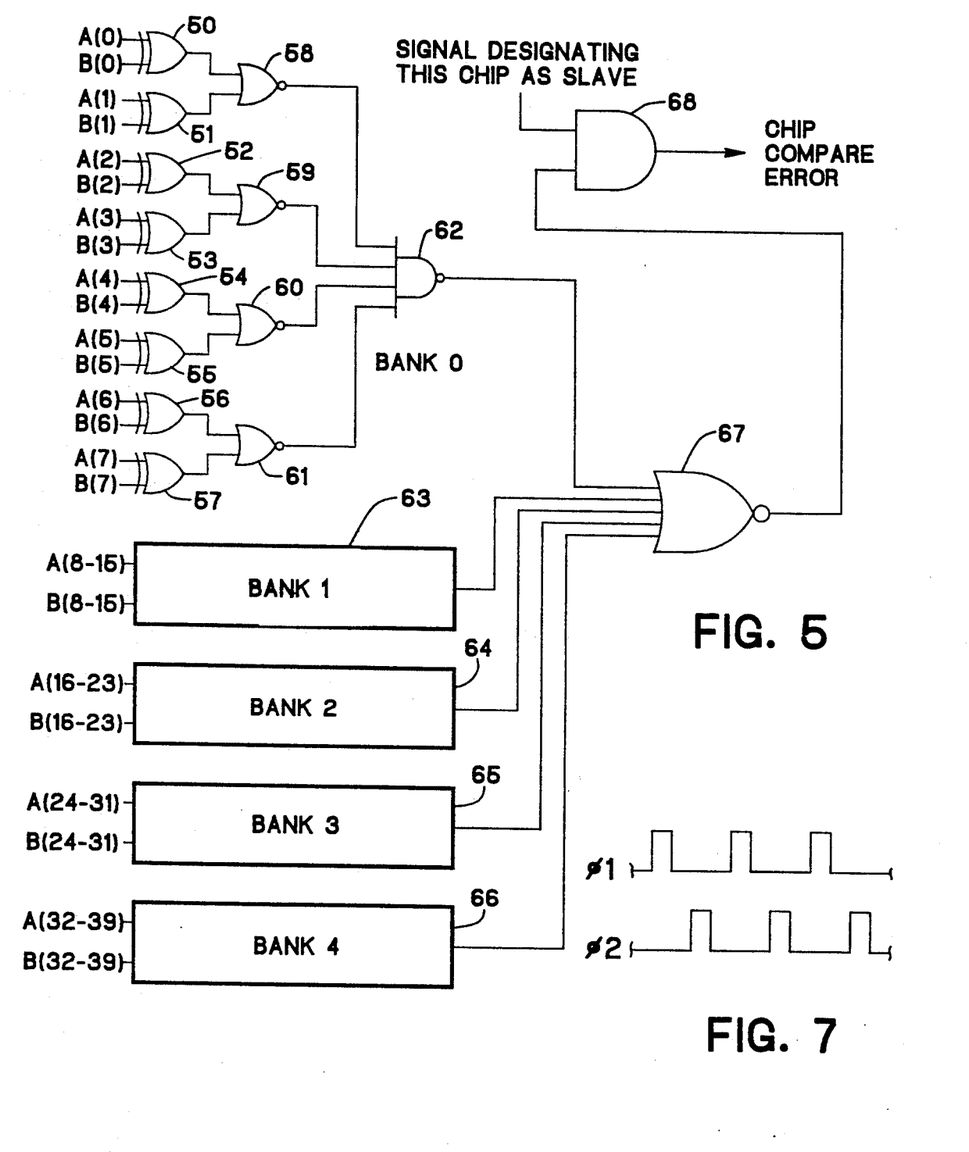
FIG. 5 is a logic diagram illustrating exemplary circuitry for detecting the presence of an error in the results of data manipulation performed in master/slave duplicate modules in a basic processing unit.
FIG. 7 is a diagram illustrating the relationship between the clock pulses of a system employing a multiphase clock.

The local results of the different BPU chip types (AX, DN, FP) may be of different lengths. FIG. 5 illustrates an exemplary configuration, particularly appropriate for VLSI implementation, for a local result length of 40 bits. It will be seen that the redundant bit 0s supplied by the master chip 40 (bit A) and the slave chip 41 (bit B), respectively, are applied to a first XOR-gate 50, the redundant bit 1s are applied to a second XOR-gate 51, the redundant bit 2s are applied to a third XOR-gate 52, and so on through the redundant bit 7s being applied to an eighth XOR-gate 57. The outputs of XOR-gates are applied as inputs to NOR-gate 58, and, similarly, XOR-gates 52, 53 drive NOR-gate 59, XOR-gates 54, 55 drive NOR-gate 60 and XOR-gates 56, 57 drive NOR-gate 61. The outputs from NOR-gates 58, 59, 60, 61 drive quad NAND-gate 62.

Now, considering only these first eight bits to be compared for identity, if each of the two inputs to one of the XOR-gates are logic 0, the output is logic 0; similarly, if each of the two inputs is logic 1, the output is again logic 0. Characteristic of the XOR function, it is only when one of the two inputs is a logic 1 and the other is a logic 0 that the output is a logic 1. Thus, so long as the A and B bits of each bit position are the same, all the inputs applied t the NOR-gates 58 are logic 0, and their outputs, applied to the NAND-gate 62, are therefore all logic 1. Consequently, the output of NAND-gate 62 is logic 0 indicating a full, bit-by-bit, compare; i.e., normal operation.

If, however, there is an instance in which the two inputs to one of the XOR-gates, say, for example, NOR-gate 54, are not the same, then the output of NOR-gate 54 switches to a logic 1 indicating that bits A and B of bit position 4 do not compare. As a result, the output of NOR-gate 60 switches to logic 0 which disables NAND-gate 62 such that its output switches to logic 1 indicating the presence of the miscompare.

In the forty-bit example, gates 50-62 comprise bank 0. Identical banks 63, 64, 65, 66, designated banks 1, 2, 3, 4, respectively, handle the remaining 32 bits of the 40-bit words being compared in eight-bit groups. The outputs of each of the five banks are applied to a five-input NOR-gate 67. Thus, so long as all bit positions of the 40-bit words from the master and slave chips are in accord, the output of NOR-gate 67 remains at logic 0 indicating normal operation while if any one or more bit positions fail to compare, the output of the NOR-gate 67 switches to logic 1 indicating a no-compare which must be reported to the CK chip 16 (FIG. 3).

As previously mentioned, one of the advantages of the invention is that fewer types of chips must be designed. Thus, the master and slave AX, DN and FP chips are identical, and either chip in a pair may be designated as the master and the other as the slave by the SP (FIG. 1). Referring back to FIG. 4, it will therefore be understood that the master chip 40 includes the same M/S chip compare circuitry as that (block 43) of the slave module 41. Returning to FIG. 5, the output of the NOR-gate 67 is therefore applied as one input to an AND-gate 68 which is selectively enabled by a signal designating this chip as the slave of the master/slave pair.

Figure 6:
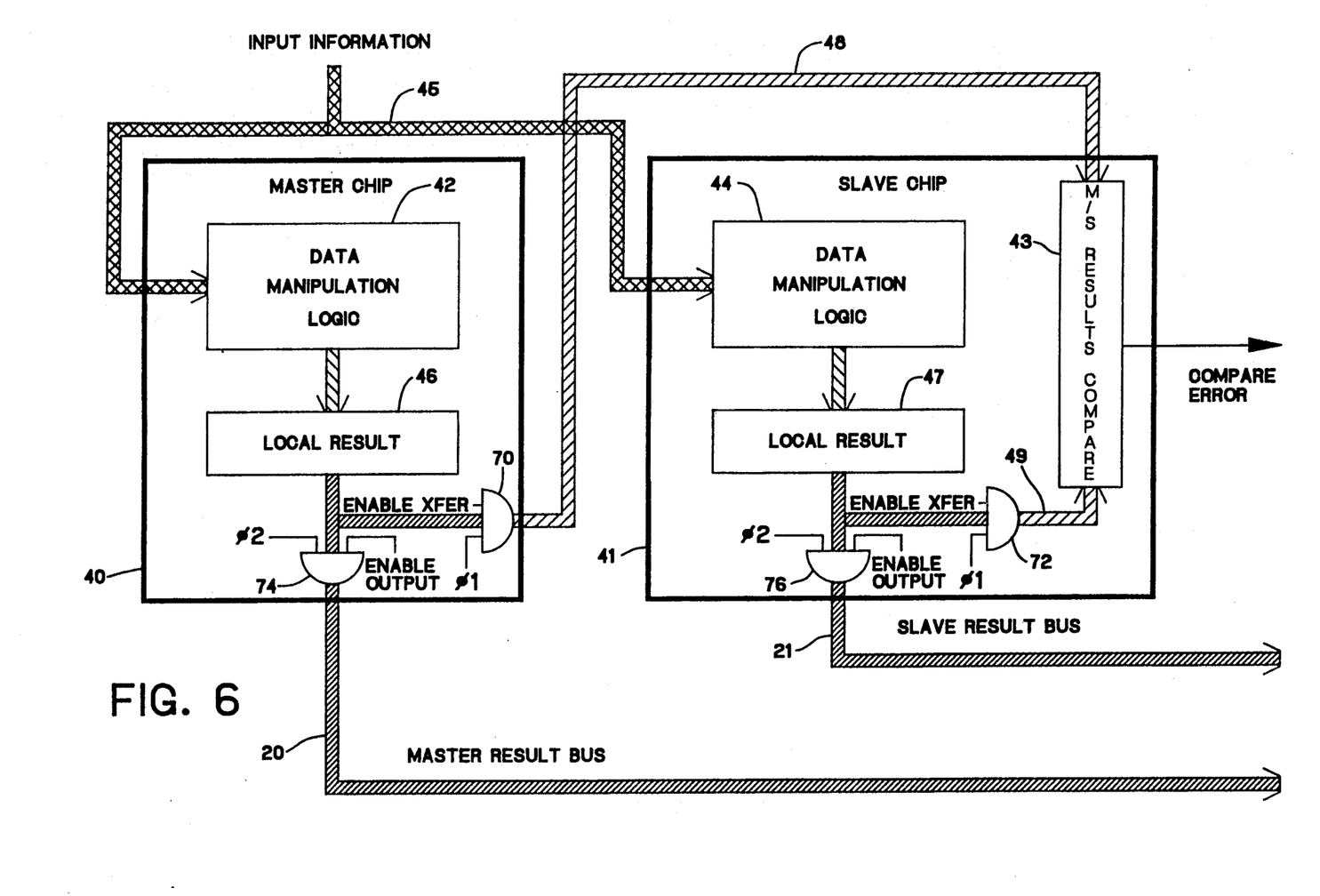
FIG. 6 is a view similar to FIG. 4 illustrating a variant configuration in which an earlier response to a sensed error may be achieved.

It is desirable that any miscompare error between the master and slave chips of a pair be sensed and recognized before any results are placed on the master and slave result busses. In systems employing, as most do, multiphase clock signals, this feature can be readily achieved as shown in FIG. 6. (Referring briefly to FIG. 7, typical multiphase clock signals are shown and include alternating, non-overlapping _1 and _2 clock pulse streams.) Thus, the local result in the master chip 40 is clocked onto the bus 48 and into the M/S results compare block 43 of the slave chip 41 through an AND-gate array 70 fully enabled by the _1 clock signal. Similarly, AND-gate array 72, fully enabled by the _1 clock signal and the OUTPUT ENABLE signal, couples the local result in the slave module to the M/S results compare block 43. Subsequently, AND-gate arrays 74, 76, which are fully enabled by the _2 clock pulses and the OUTPUT ENABLE signal, serve to couple the master and slave results, respectively, to the master result bus 20 and the slave result bus 21. (The purpose of the OUTPUT ENABLE signal is to select which of the AX chip pair, DN chip pair or FP chip pair is to issue information to the master and slave result busses in a given operation.) Thus, any miscompare sensed causes the issuance of the CHIP COMPARE ERROR signal to the CK chip 16 (FIG. 3) which can then undertake to address the problem before the incorrect information is placed on the master and slave busses.

Those skilled in the art will understand that the logic circuitry of FIG. 5 may be varied to best suit the VLSI employed in a given system. For example, the EXCLUSIVE-OR gates 50-57 can be changed to the EXCLUSIVE-NOR type if the succeeding circuitry is adjusted to establish the logic level representing the CHIP COMPARE ERROR condition correctly.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a central processing unit incorporating a basic processing unit which includes at least one processor unit and a memory unit, said processor unit including substantially identical master and slave modules to which are provided the same input information and which undertake the same data manipulation operations on the same input information substantially concurrently; the improvements comprising:

A) master and slave local result storage means in, respectively, said master and slave modules of the processor module for temporarily storing the results of data manipulation operations performed, respectively, in said master and slave modules;

B) master/slave results compare means, in said slave module;

C) clock distribution means of the central processing unit for distributing to the modules of the central processing unit two alternating non-overlapping clock pulse streams with clock pulses of each stream having a trailing edge, the trailing edge of each clock pulse of the first clock pulse stream defines an end to phase ($\Phi$) 1 of a machine cycle, and the trailing edge of each clock pulse of the second clock pulse stream defines and end to phase ($\Phi$) 2 of the machine cycle, with each phase being one-half of a machine cycle;

D) first and second local bus means for coupling the results stored respectively in said master and slave local result storage means to said master/slave results compare means at the end of $\Phi$ 1 of a machine cycle:

E) logic circuit means of said master/slave results compare means for comparing results received from said first and second local bus means and to issue a compare error signal if the results received are not identical prior to the end of $\Phi$ 2 of that machine cycle; and F) master and slave result bus means for coupling the results stored, respectively in said master and slave local result storage means to the memory unit at the end of $\Phi$ 2 of the machine cycle if the logic circuit means of the master/slave results compare means does not issue a compare error signal during the machine cycle prior to the end of $\Phi$ 2 of that cycle.

2. In a central processing unit as set forth in claim 1 in which the clock distribution means includes circuit means for suspending the production of the second clock pulse stream for at least one machine cycle if the master/slave result compare means issues a compare error signal to prevent the transmission of the results stored in the master and slave result storage means of the master and slave modules to the memory unit during said memory cycle.

3. In a central processing unit as set forth in claim 2 in which the memory unit is a store into cache including compare circuit means for comparing the results transmitted to the memory module by the master and slave result bus means when a clock pulse of the second clock stream is produced completing $\Phi$ 2 of a machine cycle.

4. In a central processing unit as set forth in claim 3 in which the master and slave modules of the processor unit each includes a master/slave results compare means with the master/slave results compare means of the master submodule being disabled.

5. In a central processing unit as set forth in claim 4, in which the master and slave modules of the processor unit of the central processing unit are each implemented on a single VLSI circuit chip.

* * * * *